Patented Oct. 16, 1945

2,387,046

UNITED STATES PATENT OFFICE 2,387,046

PREPARATION OF ZIRCONIUM DIOXIDE

Eugene Wainer, Niagara Falls, N. Y., assignor to The Titanium Alloy Manufacturing Company, New York, N. Y., a corporation of Maine No Drawing. Application July 31, 1941,
Serial No. 404,875

20 Claims. (Cl. 23—24)

This invention relates to the preparation of zirconium dioxide and other zirconium compounds of high purity. More particularly, it relates to the removal of impurities from ores containing zirconium dioxide or other zirconium ores. Still more particularly, it relates to the purification of zirconium ores by the preparation of certain sulfate derivatives of zirconium. Finally, it relates to the preparation of an improved type of zirconium oxide by calcination from zirconium oxysulfate.

The most common and economical sources of zirconia are baddeleyite, mainly zirconium dioxide with a $ZrO_2$ content varying from 60% to 95%, and the various types of zircon, or $ZrSiO_4$. The chief impurity in baddeleyite, other than more or less iron and zircon, is silica, either as one of its mineralized forms or as a silicate. Zircon minerals are found as two general types: (1) as a very fine sand, usually on beaches or other watershed areas, resulting from granitic weathering; and (2) as massive deposits of igneous origin. The massive zircons of igneous origin contain considerable quantities of impurities as an integral portion of the crystal, such impurities usually being iron oxide or silicate varying from a few tenths of a percent up to several percent. The massive zircons of North Carolina in the U. S. and the hyacinth of France are familiar examples. Although some of the impurities, such as quartz, feldspar, etc., in baddeleyite and in massive zircons may be removed by mechanical, magnetic and electrical methods, particularly with selective crushing to minus 20 to 40 mesh, a major portion of the iron oxide content is part of the zirconia mineral itself and complete mechanical separation of this ingredient is not commercially feasible.

The preparation of pure white zirconium dioxide from solutions containing considerable quantities of dissolved iron, manganese, etc. is normally a difficult and expensive procedure. An ideal procedure would be the precipitation of a zirconium compound insoluble in fairly strong acid, iron and other possible coloring agents remaining in solution, such insoluble zirconium compound being easily transformed to the oxide by calcination. Zirconium compounds which appear to fall in this category are the basic or more properly oxysulfates of zirconium, most or all of which have already been described. Such oxysulfates are definite compounds in the form of hydrates, in which the proportion of zirconium to sulfate varies from a ratio of 2 mols of $ZrO_2$ to 3 mols of $SO_3$ to a ratio of 4 mols of $ZrO_2$ to 1 mol of $SO_3$. Many of these oxysulfates or combinations of said oxysulfates are insoluble in dilute acid and serve as a means of removing coloring impurities such as iron and the like by filtration of the precipitate. Most or all of these substances have been formed by previously described procedures, but such procedures require either excessive dilution, or thermostatic temperature control, or excessive time for the precipitate to form, or are not quantitative, or the compounds percipitate in a form difficult to handle in modern chemical equipment, or the acidity at which the compound precipitates or is insoluble is too low to be of active value for removal of colored oxides on washing with water.

For example, previous investigators have shown that the best conditions for precipitation of the oxysulfate $4ZrO_2.3SO_3.14H_2O$ are: (1) a sulfate solution practically free from the sulfates of Na, K and Ca; (2) an initial acidity of about 0.5 percent and a maximum acidity of not more than 3.5 percent; (3) sufficient dilution; and (4) proper temperature control. Thus a relatively pure starting material is necessary, and of rather definite acid concentration. Dilution of at least 50 parts of water to 1 part of sulfate and preferably 100 parts of water to 1 part of sulfate is recommended and the temperature must be accurately controlled during precipitation at 39.5° C. Furthermore, the greater the amount of iron and titanium present the greater the dilution required. Another procedure requires autoclaving of zirconium hydrate with HCl and $H_2SO_4$ for a lengthy period at 200° C., the maximum concentration permissible being 9 percent $Zr(OH)_4$. Another method requires the preparation of a special chloride derivative of zirconia by a roundabout procedure, adding sulfuric acid and precipitating the basic sulfate $5ZrO_2.2SO_3$. This procedure, besides requiring the formation of a special chloride then requires a dilution of at least 30:1 before precipitation occurs. In still another method a dilute solution of zirconium oxychloride (30 to 1) is acidified with HCl in the proportion of about one mol of HCl for each mol of $ZrO_2$, treated with $H_2SO_4$ and zirconium oxysulfate of the formula $5ZrO_2.3SO_3$ precipitated therefrom. This method also requires high dilution, and is characterized by a considerable excess of acid.

It is therefore an object of this invention to eliminate impurities from crude zirconium dioxide by the preparation of insoluble zirconium oxysulfate, which results in practically quantitative yields of the $ZrO_2$ content of the original solutions or ores in a high state of purity and of brilliant white color. It is another object to provide a procedure for the preparation of such zirconium oxysulfate in a relatively short time, such as a few hours. It is a further object to provide a procedure for the preparation and precipitation of such oxysulfate with relatively small amounts of precipitating liquor, such as a concentration equivalent to 100 to 400 grams of $ZrO_2$ per liter of precipitating liquor to be made or roughly 120 to 480 grams of the oxysulfate per liter of liquor. It is another object to prepare an improved type of zirconium oxide by calcination from zirconium oxysulfate. Other objects will appear hereinafter.

These objects are accomplished by mixing with the ions of $ZrO^{++}$ (zirconyl), $SO_4^=$ (sulfate), an acid radical other than sulfate, particularly $Cl^-$ (chloride), and a basic ion other than zirconyl, the amount of such basic ion being at least sufficient to neutralize acid sulfate ion present, and the proportion of zirconyl ion to sulfate ion being between 5 to 2 and 5 to 3, and containing such an amount of water as to result in a highly concentrated solution. The solution is then filtered if necessary, heated with stirring between 40° C. and 85° C. for a certain length of time until a precipitate of acid insoluble zirconium oxysulfate forms, and the latter separated from the solution. Ions such as of or containing ammonium, lithium, sodium, potassium, calcium, copper, magnesium, zinc, aluminum, manganese, iron, cobalt, nickel, silicon and others, either as originally present or as added, may be removed by this procedure. Thus silicate ions present are separated, since silicates are not precipitated by heating at 40° to 85° C. unless present in excessively large quantities or unless the solution is allowed to stand an excessively long time before the precipitated zirconium oxysulfate is separated therefrom. Even in the latter case, the silica will "gel," so that it may be separated by merely cutting off the top layer from the reaction mixture.

The raw material used in the practice of this invention may vary widely in all the usual impurities normally occurring with zirconium ores, with the exception of $TiO_2$ and $SiO_2$. Satisfactory starting materials should contain 10 percent or less total silica and the lower the silica content the better the ore for the present purposes. Much of the $TiO_2$ is removed by the process of the present invention, but should not normally exceed 2 to 3%. In the case of baddeleyite, much or all of the siliceous material is invariably present as a separate and discrete mineral, as is the case for the titanium dioxide content. In some types of baddeleyite, the silica is combined, e. g. with $ZrO_2$, and in this case it is more difficult to separate. The silica and titania may be lowered below the prescribed limits for these impurities by crushing selectively to the proper particle size and separating by means of jigging tables for gravity separation, heavy liquids for sink and float separation, magnetic, electrostatic, electric, and/or froth flotation.

The silica content of natural baddeleyite or zircon may be lowered below the prescribed limits by fusing with a heavy excess of caustic soda, and the resultant melt leached with water to remove alkali silicates, so that the residue contains practically all the zirconia with zero to less than 10% silica. In the case of siliceous baddeleyite the finely divided ore may be attacked with $H_2SO_4$ at 400 to 500° C. and leached with water to dissolve zirconium sulfate, leaving the silica and silicates as a discardable residue insoluble in $H_2SO_4$. The clarified solution may then be evaporated and calcined to $ZrO_2$. However, a more applicable procedure from a commercial standpoint involves the heating of the siliceous ore in the presence of carbon to a temperature high enough to either volatilize off the silica or to transform it into a chemical condition susceptible to mechanical means of separation from the zirconia. When this is done in an arc furnace of the Siemens-Halske single electrode pot type, the calcined residue (to transform carbides and nitrides to oxides) will have an analysis of 90 to 98% $ZrO_2$, 0.5 to 7% silica, the iron and titania with which the furnace feed ore was originally invested, and small amounts of calcium and aluminum introduced from the coke ash. Another electric furnace procedure involves the use of the graphite type of resistance furnace, in which the silica is transformed into a coarse structured siliceous carbide easily removed by simple screening to yield an oxide after calcination containing 95 to 99% $ZrO_2$ and 0.5 to 2.0% silica plus small amount of other impurities.

The next step is to transform the raw or mechanically purified baddeleyite, or otherwise preliminarily purified zirconia into alkali, alkaline earth, or mixed alkali-alkaline earth zirconates, by fusion with alkali, alkaline earth or mixed alkali-alkaline earth oxides, hydroxides, carbonates or sulfates. Materials such as the oxides of magnesium, beryllium, zinc, copper, iron, manganese, nickel and so forth may replace the the alkalis or alkaline earths but for economical and other reasons the latter are preferred. The transformation to zirconate is necessary only when the zirconia is insoluble in dilute acids of 10 to 20% content. The material obtained as a residue from caustic fusion is directly soluble in acid and need not be further transformed, but must be leached with water to remove soda in excess of 0.6 mol per mol of $ZrO_2$. However the naturally occurring zirconia such as baddeleyite, or the zirconia residue from high temperature treatment in electric furnaces are all insoluble in dilute mineral or organic acids and must be further treated to become acid soluble.

This may be accomplished by mixing one mol of impure baddeleyite, or zirconia prepared as above, with one mol or less of soda ash, or limestone, or a mixture of soda ash and limestone. The ore, alkali, and alkaline earth all should be fine enough to pass a 300 mesh screen before mixing. The mixture is calcined for a specified length of time at a definite temperature in order to convert the $ZrO_2$ to sodium or calcium zirconates. In mixtures containing soda ash, the calcination is preferably carried out in closed saggers or crucibles, in order to prevent the volatilization and loss of sodium compounds, particularly in contact with the products of combustion of the usual fuels. By filling a crucible or sagger with the raw charge and covering with a well fitting lid elimination of soda from the zone of reaction and direct contact with fuel combustion products is prevented and a complete reaction is obtained with the proper amount of soda. In the presence of lime or other alkaline earth, the loss of soda is retarded to a considerable extent. Such precautions need not be observed where limestone alone is used. In place of soda ash the use of salt cake and coke may be used to furnish the alkali for the roast but the use of soda ash is preferred. To furnish lime for the roast, hydrated lime, quick lime, or limestone containing at least 95% $CaCO_3$ and of sufficiently finely divided nature may be used.

The choice as to the type of zirconate to be prepared depends to a certain extent on the impurities present. Thus, if the original zirconia material contains any substantial quantities of acidic oxides such as $MnO_2$, $U_3O_8$, $WO_3$, $MoO_3$, etc., a zirconate containing substantial quantities of soda is preferred. To prepare sodium zirconate, a mixture of soda ash and a material containing zirconia is calcined in full covered saggers or crucibles at 950° to 1100° C. for a time equivalent to at least one hour for each inch of thickness of charge through which the heat must pass and preferably up to 1½ hours. A sodium calcium zirconate which is equimolecular in soda and lime is calcined at 1000° to 1150° C. in closed crucibles, the period of heating preferably being 1½ hours for each inch of heat penetrable thickness. Calcium zirconate is calcined to 1050° to 1200° C. for 1½ hours for each inch of heat penetrable thickness and may be carried out in closed or open crucibles or on a muffle floor. Reaction is usually incomplete below the lower temperature limit but the temperature may exceed the upper temperature limit by a considerable amount. When the silica content approaches the allowable limit of 10% the temperature of calcination should not exceed the upper temperature limits and preferably should remain within 50° C. of the lower temperature limit to prevent hard sintering or fusion of the calcine.

The properly prepared calcined zirconate is normally a soft, easily disintegrable product which can be treated in the next step without further mechanical comminution or handling with the exception of those zirconia sources which contain more than small quantities of acidic oxides such as $MnO_2$, $WO_3$, $MoO_3$, $U_3O_8$. In this case calcines containing soda are used, and after calcination are milled with water in a ball mill for a few hours and the slurry filtered and washed by means of which the above acidic oxides are removed as their alkaline salts. Except where such acid oxide impurities are present, the zirconate of calcium or at least containing a major proportion of calcium is the preferred intermediate, since, as pointed out hereinafter, the amount of alkali ions which can be present is strictly limited to 0.6 mol of $Na_2O$ per mol of $ZrO_2$. When the amount of these interfering oxides ($MnO_2$, $WO_3$, $MoO_3$, $U_3O_8$) is less than 1 to 2% a zirconate composed of equimolecular proportions of soda and lime is preferred and the calcine leached with water before acid addition. When the amount of these interfering oxides is higher than 2%, sodium zirconate is used and the water leach will eliminate enough of the soluble alkali ions to lower the amount below that required.

The acid soluble zirconia prepared as outlined above, or any other acid soluble zirconia, is then treated in accordance with the present invention to form a solution containing zirconyl, sulfate, other acid ions, and basic ions other than zirconyl, with a maximum amount of alkali metal ions as described hereinafter. In the case of sodium zirconate, the soda content can be reduced by water leaching, the residue dissolved in HCl and any of the sulfates listed hereinafter added. The water leached sodium zirconate may be divided into two portions, one portion dissolved in hot HCl and the second portion dissolved in hot $H_2SO_4$, the two clarified and then mixed, with or without the addition of limestone. The water leached sodium zirconate may be dissolved in $H_2SO_4$ and zirconium oxychloride solution added or mixed therewith. The water leached sodium zirconate may be dissolved in a combination of HCl and $H_2SO_4$ sufficient to just dissolve the zirconia, and the liquor clarified. The water leached sodium zirconate may be treated with a combination of HCl and zirconium sulfate below 40 to 50° C. sufficient to dissolve the zirconate or with a mixture of $H_2SO_4$ and zirconium chloride below 40 to 50° C. sufficient to dissolve the zirconate, and the liquor then clarified, with the addition, if necessary, of limestone or other material containing a basic ion. Clarification is necessary only when any insoluble matter discolors the final product. The soda lime zirconates and the lime zirconates may be treated by essentially the same general procedures except that when considerable lime is present and HCl and $H_2SO_4$ are added to separate portions the two liquors are cooled, combined, and thoroughly stirred before clarification prior to precipitation is made. In dissolving the zirconates in acids, the quantity of acid required to bring a completely reacted zirconate into solution is 4 normal weights of such acid, and the sum total of combinations of acid used to bring the normal zirconates (one molecular weight) into solution need not exceed 4 normal weights of such acid. However, in the case of the previously water washed zirconates containing soda the amount of acid used is decreased by an amount equivalent to the soda or other alkali eliminated by the water leach.

Instead of dissolving an acid soluble zirconia in hydrochloric acid, it may be dissolved in other suitable acids, to form a solution of a zirconyl salt. Alternatively, solutions of zirconium salts may be formed by any other method, such as hydrolyzation of $ZrCl_4$. The zirconium may be present originally as a solution of any salt whose acid radical has a lower boiling or decomposition point than $H_2SO_4$, and which does not form insoluble precipitates under the conditions outlined herein. Such salts are the chloride, nitrate, acetate, carbonate, etc., the chloride being preferred, and the nitrate being the next best. Also satisfactory starting points are any other acid soluble zirconia or zirconium hydrate, whether or not they are highly loaded with impurities. Such acid soluble zirconia or zirconium hydrate may be dissolved in acid, such as hydrochloric acid alone, or hydrochloric acid plus sulfuric acid, as pointed out above.

The second necessary ingredient is the sulfate ion, added either as a dry material or in solution form. Any sulfate may be added whose chloride is soluble in water or dilute acid to the extent of at least 5 grams per 100 cc. of solution, the more soluble the better, while the solubility of the sulfate in water or dilute acid is at least 1 gram per 100 cc. of solution, the more soluble the better. The sulfate added may be sulfuric acid or any of the sulfates or bisulfates of ammonium, lithium, sodium, potassium, calcium, copper, magnesium, zinc, aluminum, manganese, iron, cobalt, nickel, and many other metals which are less economically practical, or the normal or acid sulfate of zirconium itself. In fact, the sulfate or bisulfate of any metal which does not form highly insoluble precipitates under the conditions outlined herein may be used. The neutral sulfates, particularly of calcium (because of its cheapness, ready availability, and white color) are preferred because they supply the necessary minimum quantity of basic iron. It will be noted that, in the case of calcium sulfate, despite the fact that a relatively insoluble material is employed, it goes completely into solution when added to the solution containing zirconyl ion, due perhaps to the fact that a complex ion is formed. This was entirely unexpected.

If the original solution to which the sulfate ion is added contains acid in excess of that indicated by the formula $ZrOCl_2$, it is also necessary to add a base, such as the carbonates or hydroxides of sodium or calcium, to neutralize this acidity. Preferably $CaCO_3$ or $Na_2CO_3$ is used. In addition, it may be desirable to add base in excess of this, as pointed out hereinafter. Finally, in the case of sulfuric acid, the bisulfates, and zirconium sulfate (which should actually be termed a bisulfate), it is necessary that there be added separately or together an amount of basic ion at least sufficient to neutralize the excess acid or hydrogen ion introduced thereby. Thus, if the sulfate is added as $H_2SO_4$, one mol of $CaCO_3$ or $Na_2CO_3$ should be added for each mol of added $H_2SO_4$. If the sulfate is added as one mol of $Zr(SO_4)_2.4H_2O$ (more properly $$ZrOSO_4.H_2SO_4.3H_2O),$$

1 mol of $CaCO_3$ or $Na_2CO_3$ should be added; for each mol of $NaHSO_4$, one-half mol of $CaCO_3$ or $Na_2CO_3$ should be added. In the case of the neutral sulfates, of course, basic ions are introduced with the sulfate molecule.

The necessity for the presence of additional basic ion besides that present in the original solution is demonstrated clearly by the resultant acidity of the liquor. Assuming that the starting solution contains two chloride ions for each zirconyl ion (which ratio is normally necessary to secure complete solution), the precipitation of each 5 mols of $ZrO_2$ will result in the release of 2 to 3 mols of HCl, as shown in the following equations:

or

It will be seen that the acidity of the resulting liquor is quite pronounced, and if this is further increased by adding the sulfate as sulfuric acid, or acid sulfate, it will be beyond the permissible limits as hereinafter pointed out, particularly at the higher concentrations. Accordingly, it is necessary to compensate for this by adding quantities of basic ion sufficient to neutralize the excess acid.

In practice, the sulfate is preferably added as $CaSO_4$, or sometimes $Na_2SO_4$. In adding either $Na_2SO_4$ or $Na_2CO_3$, however, it should be borne in mind that the total amount of alkali metal or ammonium ion present, including that present before adding such sulfate and originating with the soda ash roast, should not be more than stoichiometrically equivalent to the sulfate iron present. Under some economic conditions zirconium sulfate is preferred, since this will increase the final yield of $ZrO_2$. The zirconium sulfate used can be prepared by sulfating the original ore to form water soluble zirconium sulfate, in known fashion. The quantities of any of these basic ions present, except alkali metal or ammonium ions, either as originally present or as added, may exceed to a considerable extent stoichiometrical proportions in relation to the sulfate or even the zirconyl ions present. In the case of alkali metals or ammonium, they should not, as pointed out above, exceed an amount stoichiometrically equivalent to the sulfate ions present. The reason for this is that very soluble alkali complexes, or complexes which are in themselves insoluble and contribute to the contamination of the desired product in subsequent operations, tend to be formed with more than these amounts of alkali metal or ammonium ions.

In actual practice, it is usually desirable to add enough additional basic ion, preferably calcium carbonate, to secure a low concentration of hydrochloric acid, which insures that a practically quantitative precipitate of the zirconium from the solution will result. This procedure has the disadvantage that, unless carried out extremely carefully, it is considerably less efficient in the removal of silica, and results in increasing the lime content of the product, both of which results are detrimental for some purposes. However, if the additional calcium carbonate is calculated and added as described hereinafter, practically quantitative yields of a high purity product are added. The reason that additional basic ion is necessary is that, even when neutral sulfates are used, the resulting solution will be acid as is shown in the following equations:

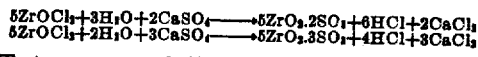

To secure a solution which will result in the highest possible recovery of zirconium from the solution (in some cases as high as 99% or above), and still accomplish the elimination of iron and other impurities, the following method is utilized: The original solution, such as of zirconyl chloride, before the addition of sulfate ion and basic ion, is titrated with standard caustic soda solution, using methyl red as an indicator, to determine total acidity. Such total acidity will include any free HCl plus the HCl equivalent of such salts as zirconium, iron, titanium or aluminum chlorides. If the sulfate is added as normal zirconium sulfate, enough calcium carbonate is added to neutralize 92 to 95% or more of the free HCl plus the chloride ion combined with the zirconyl ion, being certain, however, that the solution remains slightly acid. If the sulfate is added as a neutral sulfate, such as calcium sulfate, the combined amount of calcium in the calcium sulfate added and calcium carbonate added should be sufficient to neutralize 92 to 95% or more of the free HCl plus the chloride ion combined with the zirconyl ion as before.

The amount of sulfate added must be in the ratio of 1 mol of $ZrO_2$ to 0.4 to 0.6 mol of sulfate, or 5 mols of $ZrO_2$ to 2 to 3 mols of sulfate, and should not fall outside this ratio. Precipitation of the compounds $5ZrO_2.2SO_3$ or $5ZrO_2.3SO_3$ or both is incomplete at any ratio outside the above proportions.

In general, it is preferred to mix the various constituents as highly concentrated solutions, but they may be mixed as dry materials, and some water added, or as sludge. They may be mixed simultaneously, or separately, or in any desired order. In any case enough water is added so that intimate mixture of the reactants is possible on stirring. The digestion of the mixture of zirconyl, sulfate, chloride and other ions should take place in a dilution such that the $ZrO_2$ content is between 100 and 400 grams per liter of solution. Within these concentration limits complete solution of the ingredients, and subsequently substantially complete precipitation of the $ZrO_2$ content, with elimination of impurities, is possible. Other than zirconyl, sulfate, etc., ions, the concentration of free acid should not exceed 10%. However, the anion, other than sulfate, present must in any case be at least equivalent to the amount of cation present (as impurities or otherwise) other than zirconyl ion. The acid content, preferably HCl, over that necessary to combine completely with such impurities may under certain conditions extend to a concentration of 10% free HCl, and is preferably within the limits of 0.5 to 10% free HCl. The amount of free HCl permissible is determined by the ratio of $ZrO_2$ to $SO_3$ and the presence or absence of alkali metal or ammonium salts. For example, it has been found, in accordance with this invention, that the pure compound $5ZrO_2.2SO_3$ is insoluble in 10% HCl. On the other hand, the compound $5ZrO_2.3SO_3$ is only insoluble in 10% HCl after soluble alkali metal salts and ammonium salts are removed from the precipitate by washing with water. The desirability of removing such soluble salts, or of using higher ratios of $ZrO_2$ to $SO_3$, or of using a lower concentration of HCl, depends upon the economies involved and the desired purity of the final product.

The solution containing the reactants before precipitation may be clarified by filtration to remove insoluble matter such as silica and silicates or casual insoluble dirt. Additions are made if necessary to yield the necessary free acid content relative to HCl after precipitation is complete and the solution heated to between 40° C. and 85° C. for 30 minutes to 2 hours. The temperature of digestion is dependent on the presence or absence of free $H_2SO_4$. If free $H_2SO_4$ is present over that required to form the $5ZrO_2.2SO_3$ compound and as would be exemplified by an addition of 3 mols of $H_2SO_4$ to 5 mols of $ZrOCl_2$, the digestion temperature should be 75 to 85° C. If free $H_2SO_4$ is eliminated either by the addition of alkali or an original proportion of 5 mols of $ZrOCl_2$ to 2 mols of $H_2SO_4$, precipitation is complete at 40 to 60° C.

After digestion, the granular white precipitate is separated from the liquor in any desired fashion. Where dissolved $SiO_2$ is present in the liquor, the precipitate should first be allowed to settle, and the liquor then decanted off or, if it has been allowed to gel, the gelatinized portion cut off from the top of the reaction mass. The precipitate may then be washed or diluted with water or dilute HCl, the final washing being with 1% HCl to avoid hydrolysis of soluble iron. The product is a pure zirconium oxysulfate, which may be treated further to form other pure zirconium compounds.

To form pure zirconium dioxide, the precipitate is then calcined, such as above 900° C., until all $SO_3$ fumes are eliminated and a pure white zirconium dioxide of improved type results.

To form other zirconium compounds or salts, the precipitate may be dissolved in $H_2SO_4$ to form normal zirconium sulfate, and the latter subjected to further treatments if desired.

The invention having been described generally, the following examples are given of preferred modes of practicing the same.

Example 1

A baddeleyite containing 80.62% $ZrO_2$, 4.20% $SiO_2$, 2.70% $MnO_2$, 8.20% $Fe_2O_3$, 2.40% $Al_2O_3$, 1.25% $TiO_2$, and 0.63% of other materials, including CaO, $Na_2O$ and $Cr_2O_3$, is ground to pass a 300 mesh screen. 1250 grams of this baddeleyite is thoroughly mixed with 1060 grams of anhydrous soda ash. The charge is placed in a crucible just large enough to contain the entire batch, a cover placed on the crucible and the whole calcined at 1010° C. for a time equivalent to 1.5 hours for each inch of thickness through which the heat must pass. The cooled charge is placed in a porcelain ball mill with porcelain balls and 1500 cc. of water added. The charge is milled for three hours and then dewatered on a filter and washed once.

2900 cc. of HCl acid of specific gravity 1.16 is placed in an acid proof container and the filter cake added with stirring. In a few minutes after the addition is complete 3000 cc. of water are added and the slurry heated to 60 to 80° C. for 40 minutes to an hour after which time solution is virtually complete. After allowing insoluble matter to settle out, the clear solution is decanted off. 850 grams of finely ground calcium sulfate (gypsum) of formula $CaSO_4.2H_2O$ are added to the clear solution, and enough water added so that a volume of 8000 cc. is attained. The solution is heated with stirring to 75 to 80° C. and maintained at that temperature for two hours. The precipitate formed is then allowed to stand for one hour, filtered, and washed free of iron and similar colored ions. Washing is finished with 1% HCl solution, after which the precipitate is sucked dry and calcined at 925° C. The yield is 971 grams of a white material having the following analysis (about 94% of theoretical $ZrO_2$):

| | Per cent |
|---|---|
| $ZrO_2$ | 97.70 |
| $SiO_2$ | 1.30 |
| $TiO_2$ | 0.40 |
| $Fe_2O_3$ | 0.11 |
| $Al_2O_3$ | 0.05 |
| $MnO_2$ | Trace |
| Others | 0.44 |

Example 2

A baddeleyite containing 84.92% $ZrO_2$, 5.30% $SiO_2$, 1.10% $TiO_2$, 5.40% $Fe_2O_3$, 2.20% $Al_2O_3$, 0.40% $MnO_2$, and 0.68% of other materials, including CaO, $Na_2O$ and $Cr_2O_3$, is ground to pass a 300 mesh screen. 1250 grams of this baddeleyite is thoroughly mixed with 530 grams of anhydrous soda ash and 500 grams of pure air floated limestone ground to pass a 300 mesh screen. The charge is placed in a crucible just large enough to contain the entire batch, a cover placed on the crucible and the whole calcined at 1035° C. for a time equivalent to 1.5 hours for each inch of thickness through which the heat must pass. The charge is then milled with water, and the same procedure as in Example 1 is then followed, except that 876 instead of 850 grams of gypsum is added. The yield is approximately the same as in Example 1, the product having the following analysis (percentages):

| | Per cent |
|---|---|
| $ZrO_2$ | 98.78 |
| $SiO_2$ | 0.30 |
| $TiO_2$ | 0.35 |
| $Fe_2O_3$ | 0.05 |
| $Al_2O_3$ | 0.04 |
| $MnO_2$ | Trace |
| Others | 0.48 |

Example 3

A crude zirconium dioxide, prepared by elimination of silica from zircon sand in the arc furnace, and containing 95.20% $ZrO_2$, 4.30% $SiO_2$, 0.09% $Fe_2O_3$, 0.08% $TiO_2$, and 0.33% of other materials, including $Al_2O_3$, $CaO$, $Na_2O$, C, etc., is ground to pass a 325 mesh screen. 1280 grams of this oxide are thoroughly mixed with 1000 grams of air floated minus 300 mesh pure limestone. This charge is calcined on the floor of a semi-muffle furnace with frequent stirrings at 1035° C. until a small sample shows virtually complete solubility in a large excess of HCl.

Without further treatment or comminution the completely reacted cold charge is added to a mixture of 3920 cc. of hydrochloric acid (sp. gr. 1.16) and 3500 cc. of water and then subjected to stirring. The same procedure as outlined in Example 1 is followed, except that 830 instead of 850 grams of gypsum are added. 1182 grams of a white material having the following analysis is obtained (about 96% of theoretical $ZrO_2$):

|  | Per cent |
|---|---|
| $ZrO_2$ | 99.250 |
| $SiO_2$ | 0.400 |
| $Fe_2O_3$ | 0.005 |
| $TiO_2$ | 0.050 |
| Others | 0.295 |

*Example 4*

1840 grams of a calcine prepared as in Example 2 is added to 3740 cc. of hydrochloric acid (sp. gr. 1.16) with stirring. In a few minutes the reaction mass thickens, upon which 1800 cc. of water is added and stirring continued until solution is complete. Insoluble matter is allowed to settle and the clear liquor is decanted off.

612 grams of another portion of the same calcine is added to a solution containing 364 cc. of sulfuric acid (sp. gr. 1.82) and 728 cc. of water and stirred until the evolution of heat stops.

The total acidity of the HCl solution is determined by titrating a small portion with standard caustic, using methyl red as an indicator, and is found to be equivalent to 1410 grams of $CaCO_3$. The acid equivalent of all chloride ions other than that present as free acid and that combined with zirconyl is equivalent to 265 grams of $CaCO_3$, the remainder equal to free HCl plus that combined with $ZrO_2$ being equivalent to 1145 grams of which 95% is 1087 grams.

The sulfate slurry is now added to the HCl solution and the 1087 grams of $CaCO_3$ added with a small amount of octyl alcohol to inhibit frothing. After all the $CaCO_3$ is added, the solution is heated with stirring as before, washed twice by decantation, filtered, subjected to a final washing with 1% HCl, dried and calcined. The yield is 1390 grams of a white material having the following analysis (about 96% of theoretical $ZrO_2$):

|  | Per cent |
|---|---|
| $ZrO_2$ | 97.50 |
| $SiO_2$ | 1.50 |
| $Fe_2O_3$ | 0.09 |
| $TiO_2$ | 0.50 |
| $Al_2O_3$ | 0.05 |
| $MnO_2$ | 0.001 |
| Others | 0.37 |

When percentages or parts are mentioned in the above specification and examples, percentages and parts by weight are understood.

The term "stoichiometrically" and "stoichiometrical," as used in the present specification and claims, are understood to refer to combining proportions of the various reacting ingredients, in accordance with the well understood meaning of the terms in the art.

As many variations are possible within the scope of this invention, it is not intended to be limited except as defined by the appended claims.

The term ion has been employed throughout the specification and claims to designate radicals upon the assumption that these radicals are present in solution as reactable constituents independent of any other radical and enter into chemical combinations as though they were individual entities. Where it is indicated that acid ions and basic ions are stoichiometrically equivalent, quantities are designated which would combine to produce the normal or neutral compound.

I claim:

1. The method of purifying crude zirconium compounds or ores, comprising preparing a crude aqueous mixture containing zirconyl ions, sulfate ions, ions of an acid, other than sulfuric, which does not form insoluble precipitates with zirconium compounds in acid solutions, and basic ions other than zirconyl ions, the amount of total basic ions in said mixture, including zirconyl ions, being at least stoichiometrically equivalent to the amount of total acid ions, including sulfate ions, but with the amount of basic ions other than zirconyl being not more than stoichiometrically equivalent to the sulfate ions present, the proportion of zirconyl ions to sulfate ions being between 5 to 2 and 5 to 3, that is, between $5ZrO_2.3SO_3$ to $5ZrO_2.2SO_3$, and the concentration of zirconyl ions being such that the zirconium dioxide content is between 100 and 400 grams per liter of liquor, heating said mixture at a temperature between 40° C. and 85° C. to form a precipitate of insoluble zirconium oxysulfate between $5Zr_2.3SO_3$ and $5ZrO_2.2SO_3$, and separating said precipitate from the dissolved impurities.

2. The method of purifying crude zirconium compounds or ores, comprising preparing a crude aqueous solution containing zirconyl ions, sulfate ions, chloride ions and basic ions other than zirconyl ions, the amount of total basic ions in said solution, including zirconyl ions, being at least stoichiometrically equivalent to the amount of total acid ions, including sulfate ions, but with the amount of basic ions other than zirconyl being not more than stoichiometrically equivalent to the sulfate ions present, the proportion of zirconyl ions to sulfate ions being between 5 to 2 and 5 to 3, that is, between $5ZrO_2.3SO_3$ to $5ZrO_2.2SO_3$, and the concentration of zirconyl ions being such that the zirconium dioxide content is between 100 and 400 grams per liter of liquor, digesting said solution at a temperature between 40° C. and 85° C. to form a precipitate of insoluble zirconium oxysulfate between $$5ZrO_2.3SO_3 \text{ and } 5ZrO_2.2SO_3$$

and separating said precipitate from the dissolved impurities.

3. The method of claim 2, characterized in that at least a part of said basic ions are calcium ions.

4. The method of claim 2, characterized in that at least a part of said basic ions are sodium ions.

5. The method of purifying crude zirconium compounds or ores, comprising roasting crude zirconium oxide ore, containing not more than 10% silica and not more than 3% titania, with a material taken from the class consisting of the oxides, hydroxides and carbonates of the alkali metals and alkaline earth metals, dissolving the roasted material in hydrochloric acid to form a solution containing zirconium oxychloride, adding sulfate ions and basic ions other than zirconyl ions to said solution, adjusting all said ions in the solution so that the amount of zirconium in said solution calculated as zirconium dioxide being between 100 and 400 grams per liter, the proportion of zirconyl ions to sulfate ions present is between 5 to 2 and 5 to 3 that is, between $5ZrO_2.3SO_3$ to $5ZrO_2.2SO_3$ the amount of total basic ions in said solution, including zirconyl ions, being at least stoichiometrically equivalent to the amount of total acid ions including sulfate and chloride ions, but with the amount of basic ions other than zirconyl being not more than stoichiometrically equivalent to the sulfate ions present, digesting said solution at a temperature between 40° C. and 85° C. to form a precipitate of insoluble zirconium oxysulfate between $5ZrO_2.3SO_3$ and $5ZrO_2.2SO_3$, and separating said precipitate from the dissolved impurities.

6. The method of purifying crude zirconium compounds or ores, comprising roasting crude zirconium oxide ore, containing not more than 10% silica and not more than 3% titania, with calcium carbonate, dissolving the roasted material in hydrochloric acid to form a solution containing zirconium oxychloride, adding sulfate ions and basic ions to said solution, the amount of zirconium in said solution calculated as zirconium dioxide being between 100 and 400 grams per liter, the proportion of zirconyl ions to sulfate ions present being between 5 to 2 and 5 to 3 that is, between $5ZrO_2.3SO_3$ to $5ZrO_2.2SO_3$, the amount of total basic ions in said solution, including zirconyl ions, being at least stoichiometrically equivalent to the amount of total acid ions, including sulfate and chloride ions, but with the amount of basic ions other than zirconyl being not more than stoichiometrically equivalent to the sulfate ions present, digesting said solution at a temperature between 40° C. and 85° C. to form a precipitate of insoluble zirconium oxysulfate between $5ZrO_2.3SO_3$ and $5ZrO_2.2SO_3$ and separating said precipitate from the dissolved impurities.

7. The method of purifying crude zirconium compounds or ores, comprising roasting crude zirconium oxide ore, containing not more than 10% silica and not more than 3% titania, with calcium carbonate and sodium carbonate, dissolving the roasted material in hydrochloric acid to form a solution containing zirconium oxychloride, adding sulfate ions and basic ions other than zirconyl ions to said solution, the amount of zirconium in said solution calculated as zirconium dioxide being between 100 and 400 grams per liter, the proportion of zirconyl ions to sulfate ions present being between 5 to 2 and 5 to 3 that is, between $5ZrO_2.3SO_3$ to $5ZrO_2.2SO_3$ the amount of total basic ions in said solution, including zirconyl ions, being at least stoichiometrically equivalent to the amount of total acid ions, including sulfate and chloride ions, but with the amount of basic ions other than zirconyl being not more than stoichiometrically equivalent to the sulfate ions present, digesting said solution at a temperature between 40° C. and 85° C. to form a precipitate of insoluble zirconium oxysulfate between $5ZrO_2.3SO_3$ and $5ZrO_2.2SO_3$, and separating said precipitate from the dissolved impurities.

8. The method of purifying crude zirconium compounds or ores, comprising roasting crude zirconium oxide ore, containing not more than 10% silica and not more than 3% titania, with sodium carbonate, treating the roasted material with water to at least partially remove soluble sodium compounds, dissolving the residue in hydrochloric acid to form a solution containing zirconium oxychloride, adding sulfate ions and basic ions other than zirconyl ions to said solution, the amount of zirconium in said solution calculated as zirconium dioxide being between 100 and 400 grams per liter, the proportion of zirconyl ions to sulfate ions present being between 5 to 2 and 5 to 3 that is, between $5ZrO_2.3SO_3$ to $5ZrO_2.2SO_3$, the amount of total basic ions in said solution, including zirconyl ions, being at least stoichiometrically equivalent to the amount of total acid ions, including sulfate and chloride ions, but with the amount of basic ions other than zirconyl being not more than stoichiometrically equivalent to the total sulfate ions present, digesting said solution at a temperature between 40° C. and 85° C. to form a precipitate of insoluble zirconium oxysulfate between $5ZrO_2.3SO_3$ and $5ZrO_2.2SO_3$, and separating said precipitate from the dissolved impurities.

9. The method of purifying crude zirconium compounds or ores, comprising roasting crude zirconium oxide ore, containing not more than 10% silica and not more than 3% titania, with calcium carbonate, dissolving the roasted material in hydrochloric acid to form a solution containing zirconium oxychloride, adding calcium sulfate to said solution in an amount such that the proportion of zirconyl ions to sulfate ions is between 5 to 2 and 5 to 3 that is, between $5ZrO_2.3SO_3$ to $5ZrO_2.2SO_3$, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between $5ZrO_2.3SO_3$ and $5ZrO_2.2SO_3$, and separating said precipitate from the dissolved impurities.

10. The method of purifying crude zirconium compounds or ores, comprising roasting crude zirconium oxide ore, containing not more than 10% silica and not more than 3% titania, with calcium carbonate and sodium carbonate, dissolving the roasted material in hydrochloric acid to form a solution containing zirconium oxychloride, adding calcium sulfate to said solution in an amount such that the proportion of zirconyl ions to sulfate ions is between 5 to 2 and 5 to 3, that is, between $5ZrO_2.3SO_3$ to $5ZrO_2.2SO_3$, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between $5ZrO_2.3SO_3$ and $5ZrO_2.2SO_3$, and separating said precipitate from the dissolved impurities.

11. The method of purifying crude zirconium compounds or ores, comprising roasting crude zirconium oxide ore, containing not more than 10% silica and not more than 3% titania, with sodium carbonate, treating the roasted material with water to at least partially remove soluble sodium compounds, dissolving the residue in hydrochloric acid to form a solution containing zirconium oxychloride, adding calcium sulfate to said solution in an amount such that the proportion of zirconyl ions to sulfate ions is between 5 to 2 and 5 to 3 that is, between $5ZrO_2.3SO_3$ to $5ZrO_2.2SO_3$, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° and 85° C. to form a precipitate of insoluble zirconium oxysulfate between 5ZrO₂.3SO₃ and 5ZrO₂.2SO₃, and separating said precipitate from the dissolved impurities.

12. The method of purifying crude zirconium compounds or ores, comprising roasting crude zirconium oxide ore, containing not more than 10% silica and not more than 3% titania, with calcium carbonate, dissolving the roasted material in hydrochloric acid to form a solution containing zirconium oxychloride, adding zirconium sulfate solution to said solution in an amount such that the proportion of zirconyl ions to sulfate ions is between 5 to 2 and 5 to 3 that is, between 5ZrO₂.3SO₃ to 5ZrO₂.2SO₃, adding calcium carbonate to said solution in an amount at least equivalent to the sulfate ion in accordance with the ratio, one mole of CaCO₃ to one mole of SO₄⁼, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between 5ZrO₂.3SO₃ and 5ZrO₂.2SO₃, and separating said precipitate from the dissolved impurities.

13. The method of purifying crude zirconium compounds or ores, comprising roasting crude zirconium oxide ore, containing not more than 10% silica and not more than 3% titania, with calcium carbonate and sodium carbonate, dissolving the roasted material in hydrochloric acid to form a solution containing zirconium oxychloride, adding zirconium sulfate solution to said solution in an amount such that the proportion of zirconyl ions to sulfate ions is between 5 to 2 and 5 to 3 that is, between 5ZrO₂.3SO₃ to 5ZrO₂.2SO₃, adding calcium carbonate to said solution in an amount at least equivalent to the sulfate ion in accordance with the ratio, one mole of CaCO₃ to one mole of SO₄⁼, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between 5ZrO₂.3SO₃ and 5ZrO₂.2SO₃, and separating said precipitate from the dissolved impurities.

14. The method of purifying crude zirconium compounds or ores, comprising roasting crude zirconium oxide ore, containing not more than 10% silica and not more than 3% titania, with sodium carbonate, treating the roasted material with water to at least partially remove soluble sodium compounds, dissolving the residue in hydrochloric acid to form a solution containing zirconium oxychloride, adding zirconium sulfate solution to said solution in an amount such that the proportion of zirconyl ions to sulfate ions is between 5 to 2 and 5 to 3 that is, between 5ZrO₂.3SO₃ to 5ZrO₂.2SO₃, adding calcium carbonate to said solution in an amount at least equivalent to the sulfate ion in accordance with the ratio, one mole of CaCO₃ to one mole of SO₄⁼, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between 5ZrO₂.3SO₃ and 5ZrO₂.2SO₃, and separating said precipitate from the dissolved impurities.

15. The method of preparing improved zirconium dioxide of high purity from crude zirconium compounds or ores, comprising roasting crude zirconium oxide ore, containing not more than 10% silica and not more than 3% titania, with calcium carbonate, dissolving the roasted material in hydrochloric acid to form a solution containing zirconium oxychloride, adding zirconium sulfate solution to said solution in an amount such that the proportion of zirconyl ions to sulfate ions is between 5 to 2 and 5 to 3 that is, between 5ZrO₂.3SO₃ to 5ZrO₂.2SO₃, adding calcium carbonate to said solution in an amount at least equivalent to the sulfate ion in accordance with the ratio, one mole of CaCO₃ to one mole of SO₄⁼, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between 5ZrO₂.3SO₃ and 5ZrO₂.2SO₃, separating said precipitate from the dissolved impurities, washing said precipitate with dilute hydrochloric acid, and calcining said precipitate at a temperature above 900° C. to form zirconium dioxide.

16. The method of preparing improved zirconium dioxide of high purity from crude zirconium compounds or ores, comprising roasting crude zirconium oxide ore, containing not more than 10% silica and not more than 3% titania, with calcium carbonate and sodium carbonate, dissolving the roasted material in hydrochloric acid to form a solution containing zirconium oxychloride, adding zirconium sulfate solution to said solution in an amount such that the proportion of zirconyl ions to sulfate ions is between 5 to 2 and 5 to 3 that is, between 5ZrO₂.3SO₃ to 5ZrO₂.2SO₃, adding calcium carbonate to said solution in an amount at least equivalent to the sulfate ion in accordance with the ratio, one mole of CaCO₃ to one mole of SO₄⁼, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between 5ZrO₂.3SO₃ and 5ZrO₂.2SO₃, separating said precipitate from the dissolved impurities, washing said precipitate with dilute hydrochloric acid, and calcining said precipitate at a temperature above 900° C. to form zirconium dioxide.

17. The method of preparing improved zirconium dioxide of high purity from crude zirconium compounds or ores, comprising roasting crude zirconium oxide ore, containing not more than 10% silica and not more than 3% titania, with sodium carbonate, treating the roasted material with water to at least partially remove soluble sodium compounds, dissolving the residue in hydrochloric acid to form a solution containing zirconium oxychloride, adding zirconium sulfate solution to said solution in an amount such that the proportion of zirconyl ions to sulfate ions is between 5 to 2 and 5 to 3 that is, between $5ZrO_2.3SO_3$ to $5ZrO_2.2SO_3$, adding calcium carbonate to said solution in an amount at least equivalent to the sulfate ion in accordance with the ratio, one mole of $CaCO_3$ to one mole of $SO_4^=$, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between $5ZrO_2.3SO_3$ and $5ZrO_2.2SO_3$, separating said precipitate from the dissolved impurities, washing said precipitate with dilute hydrochloric acid, and calcining said precipitate at a temperature above 900° C. to form zirconium dioxide.

18. The method of claim 15, characterized in that calcium carbonate is added to said solution, prior to digestion, in an amount sufficient to neutralize at least 92% of the chloride ions present as free hydrochloric acid and zirconium oxychloride.

19. The method of claim 16, characterized in that calcium carbonate is added to said solution, prior to digestion, in an amount sufficient to neutralize at least 92% of the chloride ions present as free hydrochloric acid and zirconium oxychloride.

20. The method of claim 17, characterized in that calcium carbonate is added to said solution, prior to digestion, in an amount sufficient to neutralize at least 92% of the chloride ions present as free hydrochloric acid and zirconium oxychloride.

EUGENE WAINER.

CERTIFICATE OF CORRECTION.

Patent No. 2,387,046.   October 16, 1945.

EUGENE WAINER.

It is hereby certified that error appears in the printed specification of the above numbered patent requiring correction as follows: Page 1, second column, line 11, for "percipitate" read --precipitate--; page 2, second column, line 25, for "amount" read --amounts--; page 3, second column, line 75, page 4, first column, line 63, for "iron" read --ion-- page 7, first column, line 8, claim 5, after "ions" insert a comma; and that the said Letters Patent should be read with this correction therein that the same may conform to the record of the case in the Patent Office.

Signed and sealed this 25th day of December, A. D. 1945.

Leslie Frazer
First Assistant Commissioner of Patents.

(Seal)

than 10% silica and not more than 3% titania, with sodium carbonate, treating the roasted material with water to at least partially remove soluble sodium compounds, dissolving the residue in hydrochloric acid to form a solution containing zirconium oxychloride, adding zirconium sulfate solution to said solution in an amount such that the proportion of zirconyl ions to sulfate ions is between 5 to 2 and 5 to 3 that is, between $5ZrO_2.3SO_3$ to $5ZrO_2.2SO_3$, adding calcium carbonate to said solution in an amount at least equivalent to the sulfate ion in accordance with the ratio, one mole of $CaCO_3$ to one mole of $SO_4^=$, the amount of zirconium in said solution calculated as zirconium dioxide being between 100 and 400 grams per liter, and the amount of basic ions other than zirconyl being not more than stoichiometrically equivalent to the total sulfate ions present, digesting said solution at a temperature between 40° C. and 85° C. to form a precipitate of insoluble zirconium oxysulfate between $5ZrO_2.3SO_3$ and $5ZrO_2.2SO_3$, separating said precipitate from the dissolved impurities, washing said precipitate with dilute hydrochloric acid, and calcining said precipitate at a temperature above 900° C. to form zirconium dioxide.

18. The method of claim 15, characterized in that calcium carbonate is added to said solution, prior to digestion, in an amount sufficient to neutralize at least 92% of the chloride ions present as free hydrochloric acid and zirconium oxychloride.

19. The method of claim 16, characterized in that calcium carbonate is added to said solution, prior to digestion, in an amount sufficient to neutralize at least 92% of the chloride ions present as free hydrochloric acid and zirconium oxychloride.

20. The method of claim 17, characterized in that calcium carbonate is added to said solution, prior to digestion, in an amount sufficient to neutralize at least 92% of the chloride ions present as free hydrochloric acid and zirconium oxychloride.

EUGENE WAINER.

CERTIFICATE OF CORRECTION.

Patent No. 2,387,046.

October 16, 1945.

EUGENE WAINER.

It is hereby certified that error appears in the printed specification of the above numbered patent requiring correction as follows: Page 1, second column, line 11, for "percipitate" read --precipitate--; page 2, second column, line 25, for "amount" read --amounts--; page 3, second column, line 75, page 4, first column, line 63, for "iron" read --ion-- page 7, first column, line 8, claim 5, after "ions" insert a comma; and that the said Letters Patent should be read with this correction therein that the same may conform to the record of the case in the Patent Office.

Signed and sealed this 25th day of December, A. D. 1945.

Leslie Frazer
First Assistant Commissioner of Patents.

(Seal)